UNITED STATES PATENT OFFICE.

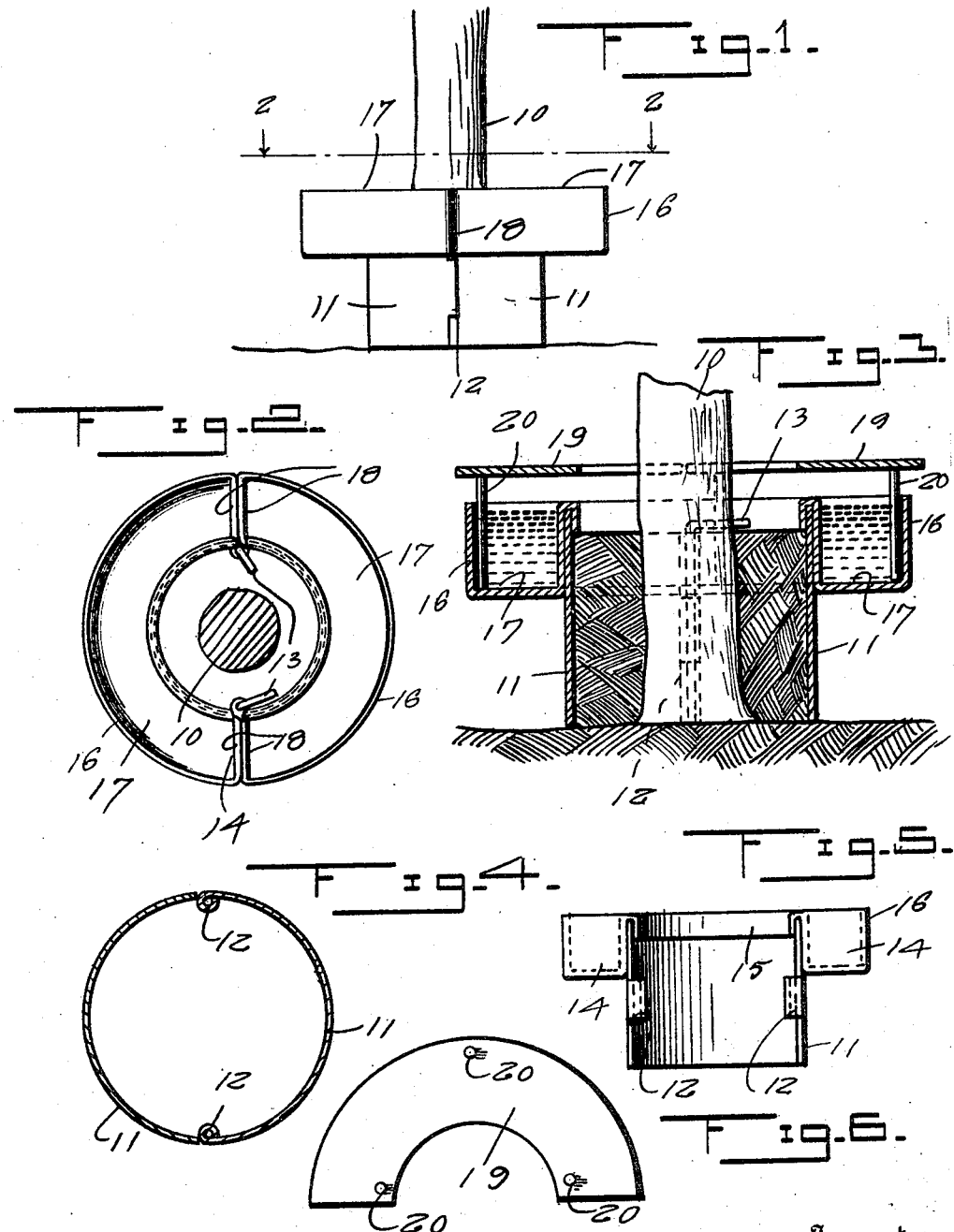

VINCENZO MARSICO, OF WATTS, CALIFORNIA.

TREE-PROTECTOR.

1,323,891.　　　　Specification of Letters Patent.　　　Patented Dec. 2, 1919.

Application filed June 18, 1918. Serial No. 240,584.

*To all whom it may concern:*

Be it known that I, VINCENZO MARSICO, a citizen of the United States, residing at Watts, in the county of Los Angeles and State of California, have invented certain new and useful Improvements in Tree-Protectors; and I do hereby declare the following to be a full, clear, and exact description of the invention, such as will enable others skilled in the art to which it appertains to make and use the same.

My invention relates to improvements in tree protectors having means for effectively combating insects.

An important object of the invention is to provide a device of the character described adapted for attachment to the trunk of a tree to prevent caterpillars and other insects from gaining access to the fruit and blossoms on the tree.

A further object of the invention is to provide a device adapted for attachment to the trunk of a tree and comprising a pair of semi-circular sections having a liquid receiving receptacle disposed in the path of the insect seeking access to the upper portion of the tree.

A further object of the invention is to provide an insect combating device adapted for attachment to a fruit tree, which is of highly simplified construction, durable in use, and cheap to manufacture.

A further object of the invention is to provide an insect combating attachment for trees, which may either be temporarily or permanently attached to the tree, the same being provided with means for compensating for the growth of the tree.

Other objects and advantages of the invention will be apparent during the course of the following description.

In the accompanying drawings forming a part of this specification and in which like numerals are employed to designate like parts throughout the same, Figure 1 is a side elevation of my improved insect combating device, showing the same applied to the trunk of a tree, Fig. 2 is a horizontal section taken on line 2—2 of Fig. 1, Fig. 3 is a vertical longitudinal section taken through my improved insect combating device, showing a cover arranged thereon, Fig. 4 is a horizontal section taken through the lower portion of the device, Fig. 5 is a side elevation of one of the semi-circular sections embodied in my invention, and, Fig. 6 is a plan view of a removable cover embodied in the invention.

In the drawings wherein for the purpose of illustration is shown the preferred embodiment of my invention, the numeral 10 designates the trunk of a tree having my improved insect combating device applied thereto.

The device comprises in part, semi-circular sections 11 clearly shown in Fig. 5. The semi-circular sections 11 are provided along their straight edges with apertured ears 12. In applying the semi-circular sections to a tree, the apertured ears 12 on each section are alined to permit of the insertion of a vertical retaining pin 13. As clearly shown in Figs. 3 and 5, each semi-circular section has secured to its upper portion a trough or receptacle 14. Each trough or receptacle 14 is semi-circular in shape and is provided with a flange 15 extending over the upper edge of the semi-circular sections 11. The semi-circular troughs comprise side walls 16, bottom walls 17 and end walls 18. The semi-circular receptacles 14 are adapted for the reception of crude oil or any other suitable liquid to prevent access of the insects to the trunk of the tree. A cover 19 may be arranged over the trough 14 if desired. Legs 20 depend from the cover 19 and extend into the trough 14. The cover 19 may be formed of two semi-circular sections.

In applying my improved insect combating device to a tree, the semi-circular sections 11 are placed therearound. To secure the device in this position, the pins 13 are passed through the alining apertures 12. As clearly shown in Fig. 3 the space between the tree and the side walls of the semi-circular sections 11 is filled with dirt. Crude oil may be placed in the trough 14 and thus prevent the passage of the insects to the upper portion of a tree.

While I have shown and described the preferred embodiment of my invention, it is understood, that I may make such minor changes in arrangement and construction of parts, as will remain within the spirit of the invention and the scope of the appended claims.

Having thus described my invention, what I claim is:—

1. A tree protector including a cylindrical member, an annular liquid receiving receptacle surrounding the cylindrical member and being U-shaped in cross section, the inner wall of the receptacle being bent inwardly and downwardly for forming an annular flange extending over the upper portion of the cylindrical member and detachably engaging the same for supporting the receptacle.

2. A tree protector including a cylindrical body portion, a pair of semi-circular receptacles surrounding the cylindrical member, flanges detachably securing the receptacle to the cylindrical member and a sectional cover having legs extending into the receptacle for supporting the cover in spaced relation to the receptacle.

In testimony whereof I affix my signature in presence of two witnesses.

VINCENZO MARSICO.

Witnesses:
ANNABEL SMITH,
D. M. HUNSAKER.